Oct. 6, 1959   JEAN-CLAUDE ROUCAYROL ET AL   2,907,881
RADIO-ACTIVITY MEASURING DEVICE
Filed March 16, 1956
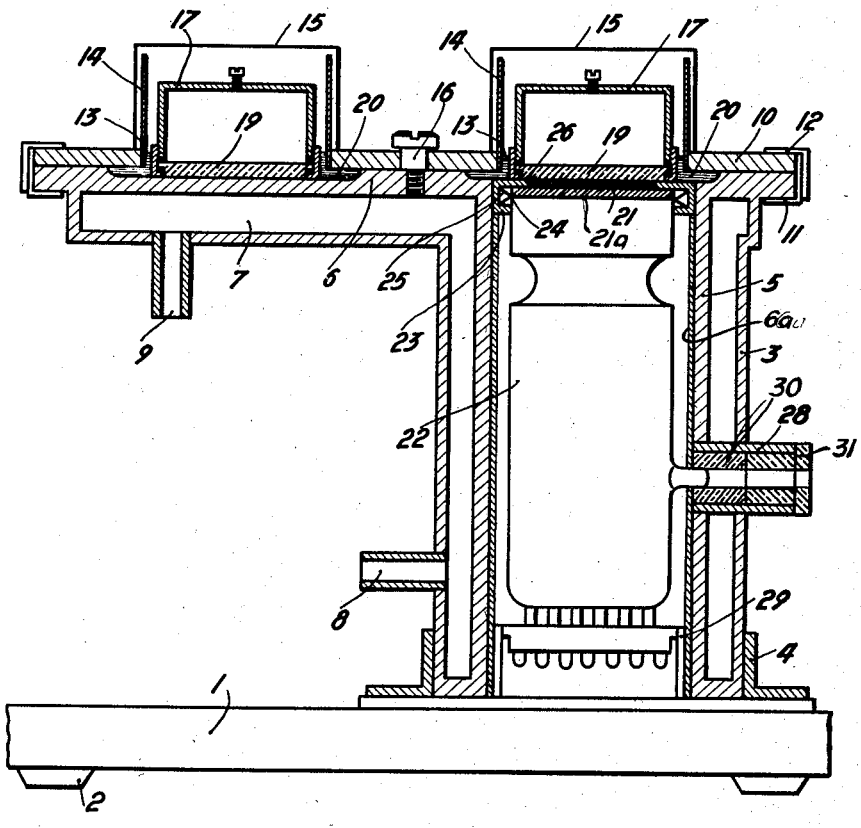
Inventors
Jean-Claude Roucayrol
Erich Oberhausen
By Allen + Allen
Attorneys

United States Patent Office 2,907,881
Patented Oct. 6, 1959

2,907,881

RADIO-ACTIVITY MEASURING DEVICE

Jean-Claude Roucayrol, Paris, France, and Erich Oberhausen, Homburg, Saar Territory, assignors to Centre National de la Recherche Scientifique, Paris (Seine), France, a corporation of France Application March 16, 1956, Serial No. 571,966

Claims priority, application France March 19, 1955

6 Claims. (Cl. 250—71)

The use of radio-active tracers which emit soft $\beta$ particles such as $S^{35}$, $C^{14}$, and especially $H^3$, has not become as general as could have been hoped in certain fields of research, mainly as a result of the difficulty which is encountered in effecting a measurement of their activity in a rapid and sensitive manner.

In order to remedy this state of things, it has been proposed to dissolve the marked compound in a solution having the property of scintillating whenever a disintegration takes place, the impulse of light produced being received by a photo-multiplier and then transformed into an electrical impulse which is detected by means of suitable electronic devices.

While these improvements enable the rapidity of measurement to be increased, the same thing is not, however, true as regards the sensitivity which, quite apart from the choice of the photo-multiplier and the scintillator, depends on the number of impulses given per unit of time by the photo-multiplier in the absence of any radio-active sample, on its fluctuations, and especially on the quality of the optical coupling between the fluorescent solution and the photo-cathode.

Now, while it is a simple matter to measure the activity of compounds emitting hard $\beta$ rays, which supply a large number of photons at each scintillation, it is essential, especially in the measurement of the activity of emitters of soft $\beta$ rays to have a detection device which is as sensitive as possible.

The present invention has for its object a sample-passing device which is particularly sensitive, which permits of rapid measurement of radio-activity by means of scintillations produced in a liquid medium in which is dissolved a compound which emits radiation such as $\gamma$ photons, hard or soft $\beta$ particles, and $\alpha$ particles.

The invention is essentially characterised by the fact that by means of suitable devices, the samples to be studied, which are arranged in chambers, are brought in succession above a photo-multiplier, the anode and the cathode of which are carefully insulated, the said photo-multiplier receiving the impulses of light produced in the solution by the disintegration of the radio-active compound and which have previously passed through transparent members which are constantly kept in darkness, at the same temperature and which have refractive indices which are as close to each other as possible.

To this end, particular use is made of a keeper ring for the anode connection, together with water-resisting substances which cover the wall of the photo-multiplier, and more especially an appropriate intermediate liquid which is very transparent at the wave-lengths emitted and which is arranged in particular between the chamber containing the solution to be studied and the photo-multiplier, with the object of forming a satisfactory optical coupling between these members. In addition, the intermediate liquid facilitates the successive passing of the samples, the activity of which is to be determined, by the elimination of all friction between the members which carry out this function.

In this device, advantage is found in the use of paraffin as a water-resisting substance, the paraffin being suitably disposed by any known means on the wall of the photo-multiplier and, as an intermediate liquid, a mineral oil for example that known by the commercial name of "Mayoline 248L."

With this device, the number of impulses per unit of time supplied by the photo-multiplier in the absence of a radio-active sample is reduced to the minimum as a result of it being possible to carry out the measurements at relatively low temperatures, to keep the apparatus in darkness, and to effect a perfect insulation between the anode and the cathode of the photo-multiplier.

In the same way, during the course of measurement, the number of impulses per unit of time fluctuates only slightly, due to the fact that, before measurements are made, the chambers of which the emission of light is to be measured, are arranged in the apparatus for a sufficient time for them to be brought to the same temperature as the photo-cathode, and because in addition, since the apparatus works in darkness, all phosphorescence produced by the action of visible radiations on the scintillator liquid disappears.

As on the other hand, the internal walls of the chambers containing the solution are covered by substances which have a high coefficient of reflection with respect to incident rays, while the impulse of light is propagated in media having refractive indices which are close to each other and which have a high transparency with respect to the emitted radiations, it follows that this device has a very high sensitivity.

By way of indication only and without any implied limitation, a form of embodiment of the invention will now be described, reference being made to the diagrammatic view shown in Fig. 1 of the attached drawing, which shows a cross-section of an apparatus in current use.

Further features and advantages of the apparatus in accordance with the invention will become apparent during the course of the description which follows below.

Referring now to Fig. 1, the device mainly comprises:

A base-plate 1 of heavy metal which gives an adequate stability to the whole apparatus, and which is mounted on rubber-covered feet 2.

A body 3 which is adjusted on the base by sliding inside flanged members 4 and which is fixed in position by means of clamping screws, not shown in the drawing.

This body is essentially constituted by a cylindrical portion 5 terminating at its upper part in a plate 6 provided with a jacket 7 so as to permit of a methodic circulation of a liquid at a pre-determined temperature, the liquid being passed through the tubular members 8 and 9.

A circular plate 10 of the same diameter as the plate 6 and mounted above the latter.

Overlapping flanges 11 and 12 are respectively fixed to the plates 6 and 10.

The plate 10 is provided with orifices 13, around the periphery of which are fixed hollow cylinders 14, each provided with a cover 15. This plate 10 can rotate about an axis 16 at right angles to its plane and to that of the fixed plate 6 and located at the centre of these plates.

In the openings 13 are mounted containers 17 which contain the radio-active sample dissolved in the liquid scintillator. These containers are constituted by metallic cylindrical chambers, for example of brass, having a capacity of about 12 cu. cm., the internal walls of which are reflecting, a window 19 of quartz being provided and fixed by any appropriate known means.

The lower plate 6 has an annular depression with a flat base formed at its upper portion, this depression being intended to receive an intermediate liquid 20 into which dips the quartz window of the containers 17. This liquid also covers the upper face 21 of the wall of the photo-multiplier 22. The photo-multiplier 22, the walls of which are made water-resisting by means of paraffin for example, is fixed to the member 23 which fits tightly into the cylinder 5. This member is provided with a groove 24 in which are arranged metallic spring blades 25 providing the connection of the cathode, and a shoulder 26 on which the containers 17 are placed. Liquid-tightness is ensured by means of a substance insoluble in the liquid 20, this substance being disposed in all the empty spaces.

The connection of the anode 27 of the photo-multiplier is suitably insulated by guard rings and is housed inside the tubular member 28 through which is passed the connecting wire, not shown on the drawing. The photo-multiplier comprises a base 29 to which are fixed by any suitable means the resistances forming the potential divider and the capacities (not shown) necessary for its operation.

In this device, the internal surface of the cylinder 5, together with the internal superposed faces of the plates 6 and 10, are covered with a matt black substance, such a varnish for example.

In order to carry out measurements, the containers 17 are placed in the openings 13 of the moving plate 10 and the covers 15 are placed in position. A circulation of liquid is produced in the jacket 7 in such manner as to maintain the temperature of the apparatus constant during the measurement.

When a temperature of equilibrium has been reached, a container is brought into position above the photo-multiplier by rotating the plate 10 and the measurement is made.

When the measurement is completed, a second container is brought into position above the photo-multiplier by rotation of the plate 10, the container which has been tested is replaced by a new container, and so on.

If it is necessary to change the photo-multiplier, the lower part of the cylinder 5 is freed from the base by sliding the body of the apparatus in the flanged members 4, thus making the photo-multiplier accessible so as to be able to change it, after having removed the liquid 20.

It should be observed that the rotation of the plate 10 enables any bubbles of air to be eliminated which might have been introduced beneath the quartz window 19 of the containers 17, and the presence of which would substantially reduce the sensitivity of the device. In addition, the use of mineral oil as an intermediate liquid facilitates the movements of the plate 20 which bring the containers 17 in succession above the photo-multiplier, without friction.

By way of example, the results given below were obtained with a device in accordance with the invention, in current use, and relating to the measurement in absolute units of the activity of various compounds marked with $S^{35}$ and with $C^{14}$.

Number of impulses per minute recorded without a container above the photo-multiplier:

$S^{35}$ _____ 930
$C^{14}$ _____ 1130

Number of impulses per minute recorded with a container filled with scintillator liquid above the photo-multiplier, in the absence of radio-active compound:

$S^{35}$ _____ 1700
$C^{14}$ _____ 1970

The minimum activity measurable at the end of 30 minutes of counting, with a relative standard percentage deviation of 2% corresponding to a number of impulses per minute of 570 for the $S^{35}$ and 615 for the $C^{14}$, is as follows:

Curies
For the $S^{35}$ _____ $2 \times 10^{-10}$
For the $C^{14}$ _____ $2.7 \times 10^{-10}$ By integrating the impulses with the aid of a standard resistance-capacity device, only relative values are obtained; but under normal conditions of measurement, the sensitivity of the apparatus is however very great, since it is possible to evaluate at $6.7 \times 10^{-11}$ curies for the $S^{35}$, at $8.5 \times 10^{-11}$ curies for the $C^{14}$, and at $1.5 \times 10^{-9}$ curies for the $H^3$, the activities which it is possible to measure during a period of measurement of 30 minutes, and with a relative standard percentage deviation of 2%.

What we claim is:

1. A sample-passing device for the rapid, uninterrupted and sensitive measurement of the radio-activity of a series of emitting compounds, each one of said compounds being disposed in a state of solution in a liquid scintillation producing medium enclosed in a container including a transparent base wall, said device comprising: a base plate; a substantially vertical hollow body on said plate; a photo-multiplier device housed within said hollow body and permanently excited; a fixed circular plate fast with the upper extremity of said hollow body, the diameter of said fixed plate being substantially greater than that of said body and the axis of said plate being laterally displaced with respect to the axis of said body; said plate and the upper extremity of said body having an opening; a movable circular plate pivotally mounted on the axis of said fixed plate, said movable plate having substantially the same diameter as said fixed plate; said movable plate having at least two openings; said last mentioned openings being adapted to register successively with said first mentioned opening in said fixed plate during rotation of said movable plate; an open cylindrical member fixed to the circumferential edge of each of the openings in said plate and adapted to receive one of said containers; detachable substantially light-tight covers for said open cylindrical member; a shallow annular depression formed in the upper surface of said fixed plate, associated with the openings in the said movable plate and of substantially greater width than said openings; and a transparent intermediate lubricating liquid filling said depression, said liquid having a refractive index close to that of said transparent base wall.

2. A sample-passing device as claimed in claim 1, wherein said lubricating liquid is a mineral oil.

3. A sample-passing device as claimed in claim 1, wherein said transparent base wall is made of quartz.

4. A sample-passing device as claimed in claim 1, wherein said photo-multiplier includes a photo-tube comprising an anode and a cathode insulated from each other by means including guard-rings around the anode connection and a water-resisting coating applied to the internal walls of said photo-multiplier.

5. A sample-passing device as claimed in claim 1, wherein said photo-multiplier includes a photo-tube comprising an anode and a cathode insulated from each other by means including guard-rings around the anode connection and a water-resisting coating applied to the internal walls of said photo-multiplier; and further comprising a jacket for circulating fluid, disposed around said body and the underside of said fixed plate; piping means in said jacket for the inlet and outlet of said fluid; resilient means for fixing said photo-multiplier to the upper extremity of said body, said resilient means serving as the cathode connection of said photo-multipler; and tube means passing through said jacket for leading in the anode connection to said photo-multiplier.

6. A sample-passing device as claimed in claim 1, wherein the internal surface of said body and the internal superposed surfaces of said fixed and movable plates are covered with a matt black coating.

References Cited in the file of this patent

UNITED STATES PATENTS

| | | |
|---|---|---|
| 2,490,298 | Ghiorso et al. | Dec. 6, 1949 |
| 2,711,084 | Bergan | June 21, 1955 |
| 2,714,169 | Armistead | July 26, 1955 |
| 2,750,514 | Armistead | June 12, 1956 |

OTHER REFERENCES

"Liquid Scintillation Techniques for Radiocarbon Dating," by Pringle et al., from The Review of Scientific Instruments, vol. 26, No. 9, September 1955, pages 859–865.